Jan. 11, 1944.  J. J. McBRIDE ET AL  2,339,022
REGULATOR FOR BRAKE RIGGING
Filed Oct. 6, 1941
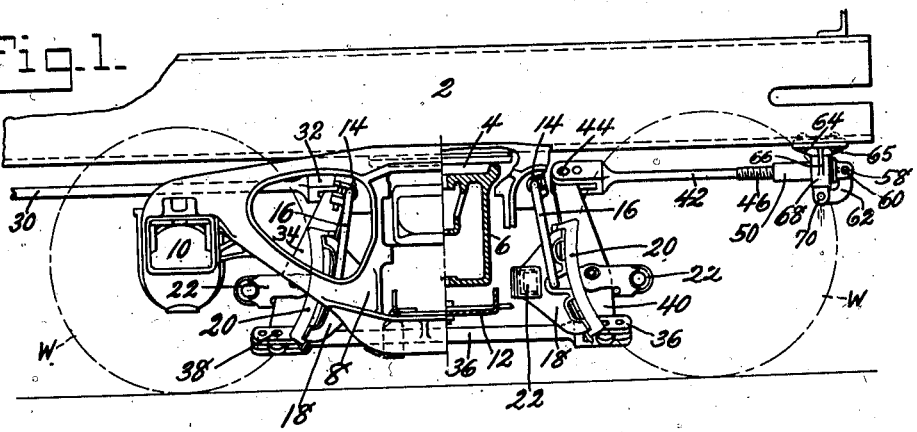
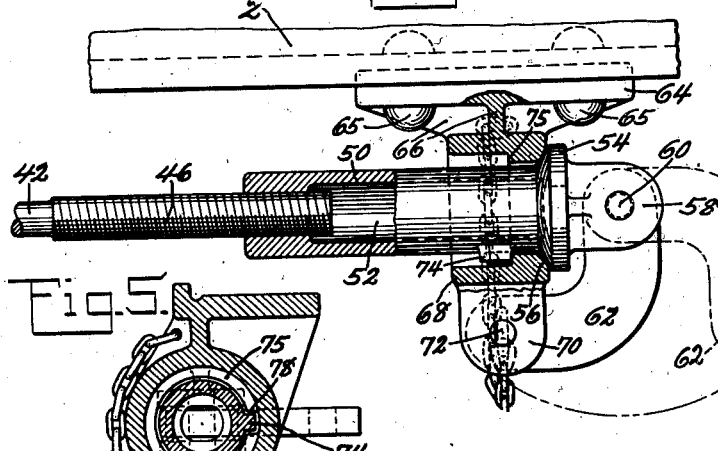
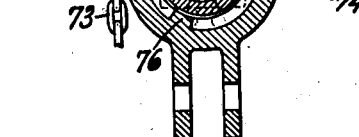
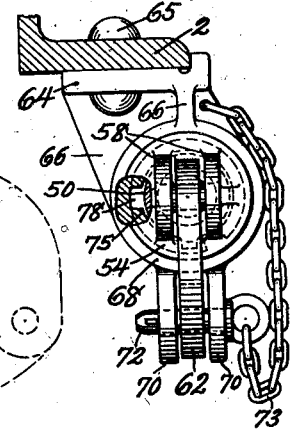
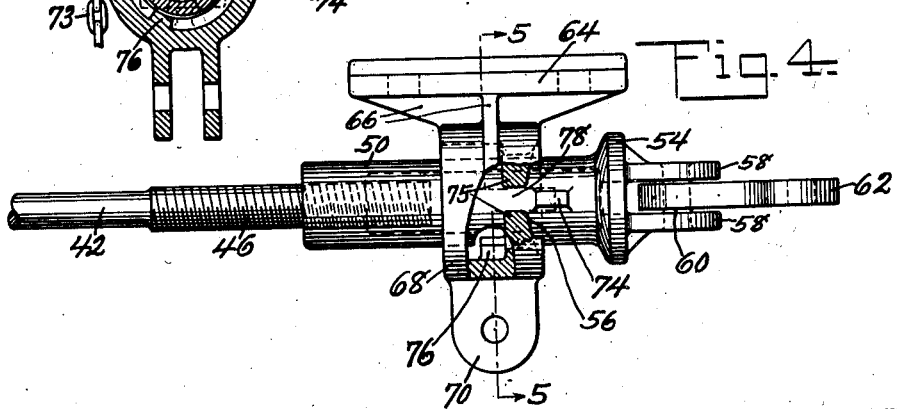
INVENTORS
John J. McBride
Ernest R. Schroeder
Victor Willoughby
BY ATTORNEY Patented Jan. 11, 1944

2,339,022

UNITED STATES PATENT OFFICE 2,339,022

REGULATOR FOR BRAKE RIGGING

John J. McBride, Bayonne, Ernest R. Schroeder, Hawthorne, and Victor Willoughby, Ridgewood, N. J., assignors to American Car and Foundry Company, New York, N. Y., a corporation of New Jersey Application October 6, 1941, Serial No. 413,718

6 Claims. (Cl. 188—197)

This invention relates in general to regulators for the foundation brake rigging of railway vehicles and in particular to regulators for positively adjusting the brakes to a predetermined slack for release purposes.

In the past brake rigging regulators have been applied to the brake rigging adjacent the brake cylinder and in later years to the foundation rigging on the trucks. The latter type of regulator has included in all instances a plurality of moving parts which are apt to become jammed or corroded in place, thus preventing the proper operation of the regulator. It is an object, therefore, of the present invention to provide a regulator for foundation brake rigging, which regulator is provided with the minimum of moving parts.

A further object of the invention is the provision of a regulator or foundation brake rigging, which regulator is positive in action.

A still further object of the invention is the provision of a regulator for foundation brake rigging, which regulator positively provides the proper amount of slack in the brake rigging.

These and other objects of the invention will be apparent to persons skilled in the art from a study of the following description and accompanying drawing, in which:

Figure 1 is an elevational view of a railway truck and car underframe with parts removed or shown in section to better disclose the brake rigging;

Fig. 2 is an enlarged sectional view of the improved regulator;

Fig. 3 is an end view of the improved regulator with a small area broken away to better disclose the construction;

Fig. 4 is a side view of the improved regulator with the parts shown in position for adjusting the brake rigging, and Fig. 5 is a sectional view taken substantially on line 5—5 of Fig. 4.

Referring now to the drawing in detail, it will be seen from Fig. 1 that the car center sills 2 are supported through center bearing 4 upon truck bolster 6, which in turn is supported in any suitable manner upon the truck side frames 8. The side frames 8 are in turn supported by bearings located within journal boxes 10 upon wheel and axle assemblies W. The truck side frames, which in the present case are located outside the wheels, are connected together by a spring plank 12, although the spring plankless type of truck may be used if desired. Each of the truck side frames is provided with brackets or other means 14 pivotally carrying brake hangers 16, the lower ends of which are pivotally connected to brake heads 18. These brake heads carry brake shoes 20 and are connected to brake beams 22 of the truss type.

The brake rigging consists of a top pull rod or top connection 30 connected through suitable leverage to the brake cylinder (not shown). The truck end of this pull rod or top connection terminates in a jaw 32 pivotally connected to the upper end of live lever 34. This live lever is pivotally connected intermediate its length to the brake beam and at its lower end to a bottom connection 36 through the medium of pivot pin 38. The bottom connection as shown is of the usual type having jaws on either end with a plurality of holes therein permitting adjustment between the bottom connection and brake levers. The end of the bottom connection opposite from the live lever is pivotally connected to dead lever 40, which in turn is pivotally connected intermediate its ends to the adjacent brake beam and at its upper end to an anchor rod or dead lever fulcrum rod 42. The pivotal connection between the anchor rod or dead lever fulcrum rod is accomplished by means of pin 44 passing through the rod and through the upper end of the dead lever. The anchor rod or dead lever fulcrum rod extends forwardly toward the adjacent end of the car and has its end threaded as at 46. This threaded end is adapted to be engaged by an adjusting nut forming the main part of the regulator. This adjusting nut, as clearly shown in Fig. 2, is formed with a cylindrical hollow extension 50 internally threaded for a part of its area in order to engage the threaded portion of the anchor rod, while the remaining portion of the interior is slightly enlarged to provide a grease or lubricant cavity 52. Grease or other lubricant placed in this cavity will, of course, prevent corrosion of the threads and insure easier operation when it is desired to adjust the brakes. The adjusting nut is also formed with a head portion or collar 54, having the inner surface forming a segment of a sphere and adapted to engage a similarly shaped surface 56 formed on the anchor bracket later to be referred to. The adjusting nut is also provided with spaced ears 58 adapted to receive a pivot pin 60 anchoring one end of combined lock and operating handle 62. The anchor bracket, previously referred to, is formed with an upper flat surface part 64 by means of which it may be firmly attached to the center sill flanges by any suitable devices such as rivets 65. Dependent from the flat upper part are a plurality of angularly disposed ribs 66 merging into and suitably bracing the tubular part 68 through which the adjusting nut may pass. The bracket is also formed with downwardly extending ears 70 adapted to receive the combined operating lock and handle 62 therebetween, permitting a locking and sealing pin 72 to be inserted therethrough. This pin is held against loss by means of chain 73 fastened at one end to the pin and at the other end to the anchor bracket. In order to insure the proper amount of slack in the brake rigging a lug 74 is formed on the adjusting nut in spaced relation to the collar 54. This lug is engaged over the lip portion 75 of the anchor bracket to prevent unauthorized forward movement of the nut with respect to the anchor bracket. The lug also is adapted to contact a lug 76 formed in the cylindrical portion of the bracket, as clearly shown in Fig. 5, in order to prevent accidental and improper adjustment of the brake. As clearly seen in Figs. 3, 4 and 5, the lip portion 75 is provided with a notch 78 of sufficient size as to receive and permit passage therethrough of lug 74 carried on the adjusting nut. This notch or slot is located in the anchor bracket at such a position as to necessitate substantially a quarter turn of the adjusting nut from the locked position of Fig. 2 to the adjusting positions of Figs. 4 and 5.

When excessive wear necessitates adjustment of the brake, the seal and locking pin 72 is removed and operating handle 62 swung outwardly from the full line position to the line and dash position of Fig. 2, then the adjusting nut is turned substantially 90 degrees in the proper direction to bring lug 74 in alignment with slot or groove 78. With the adjusting nut in this position the operator pulls outwardly until lug 74 clears the lip of the anchor bracket sufficiently to permit a slight turn of the adjusting nut in a clockwise direction, thus bringing the lug 74 into engagement with the spherically curved surface 56 of the anchor bracket. The operator may now continue to rotate the adjusting nut in a clockwise direction until it has been threaded onto the anchor rod or dead lever fulcrum anchor rod 42 as far as the brake slack will permit. When the entire amount of slack available has been taken up through rotation of the nut, then lug 74 is again lined up with slot or groove 78 and the entire assembly pushed inward, bringing the spherically curved surface of the collar into engagement with the spherically curved surface 56 of the bracket. The nut is then rotated 90 degrees to a position in which handle 62 may be swung inwardly between ears 70 and locking pin 72 inserted. Thus it will be seen that although the operator takes up all available slack when the adjusting nut is pulled outwardly, the proper amount of slack is returned to the rigging when the nut is pushed back from the position of Fig. 4 to the position of Fig. 2. The amount of slack desired is taken care of by the position or extent of lug 74 and is equal to the distance from the inner edge of the lug 74 to the inner spherically curved surface of the collar 54. Provision of lug 76 will prevent any person not familiar with the proper operation from jamming the mechanism tight and taking up all slack. It is obvious that if all slack were taken up, then the brakes would be applied or jammed whenever the car truck rotated about the center bowl. The necessary swinging movements of the truck are permitted without injuring the mechanism since the anchor rod bracket and adjusting nut are provided with sufficient clearance and with spherically curved seating surfaces.

While the invention has been described more or less in detail with specific reference to one form thereof, it will be apparent to persons skilled in the art that various modifications and rearrangements of parts, other than those shown and described, may be made and all such modifications and rearrangements of parts are contemplated as will fall within the scope of the appended claims.

What is claimed is:

1. A regulator for the brake rigging of railway cars comprising an anchor bracket adapted to be rigidly secured to a railway car underframe part, an anchor rod adapted to be connected to a brake rigging part, and an adjusting nut having threaded engagement with said anchor rod and bearing on said anchor bracket to resist tension in said rod, said adjusting nut and anchor bracket being provided with cooperating bearing areas formed as segments of a sphere whereby the adjusting nut may have limited universal movement relative to the bracket.

2. A regulator for the brake rigging of railway cars comprising an anchor bracket adapted to be rigidly secured to a railway car underframe part, an anchor rod adapted to be connected to a brake rigging part, and an adjusting nut having threaded engagement with said anchor rod and bearing on said anchor bracket to resist tension in said rod, said adjusting nut being formed with projecting means cooperaitng with said bracket to insure retention of a predetermined amount of slack in the brake rigging subsequent to removal of all slack from the brake rigging through rotation of the adjusting nut and to also prevent sliding movement of the anchor rod relative to the bracket after adjustment, and additional means formed on said bracket and adjusting nut and locking the latter against both rotational and sliding movement.

3. A regulator for the brake rigging of railway cars comprising an anchor bracket adapted to be rigidly secured to a railway car underframe part, an anchor rod adapted to be connected to a brake rigging part, an adjusting nut having threaded engagement with said anchor rod and formed with a spherically curved bearing area normally bearing on a similarly curved area of said anchor bracket to resist tension in said rod and permit substantially universal movements therebetween, and a projection formed on said adjusting nut in spaced relation to said bearing area, said projection being adapted to bear on the anchor bracket bearing area during rotation of the adjusting nut to remove all slack from the brake rigging and being normally spaced inwardly of the anchor bracket bearing area to insure a predetermined amount of slack in the brake rigging.

4. A regulator for the brake rigging of railway cars comprising an anchor bracket adapted to be rigidly secured to a railway car underframe part, a lip formed on said bracket and providing a bearing area, an anchor rod adapted to be connected to a brake rigging part, an adjusting nut having threaded engagement with said rod and being formed with a collar adapted to normally rest on said bracket lip bearing area to resist tension in said anchor rod, and means on said bracket and adjusting nut to prevent rotational and sliding movement of the nut when in normal engagement with said bracket, said means including a projection formed on said adjusting nut and underlying said bracket lip when the adjusting nut is in normal engagement with the bracket.

5. A regulator for the brake rigging of railway cars comprising an anchor bracket adapted to be rigidly secured to a railway car underframe part, a lip formed on said bracket and providing a bearing area, an anchor rod adapted to be connected to a brake rigging part, an adjusting nut having threaded engagement with said rod and being formed with a collar adapted to normally rest on said bracket lip bearing area to resist tension in said anchor rod, a projection formed on said adjusting nut in spaced relation to said collar and normally positioned inwardly of said bracket lip in overlapping relation therewith to prevent sliding movement of said adjusting nut, and a groove formed in said bracket lip and adapted to allow movement of said projection therethrough whereby said projection may be brought from the normal position to a position in which the projection rests upon said lip bearing area.

6. A regulator for the brake rigging of railway cars comprising an anchor bracket adapted to be rigidly secured to a railway car underframe part, a lip formed on said bracket and providing a bearing area, an anchor rod adapted to be connected to a brake rigging part, an adjusting nut having threaded engagement with said rod and being formed with a collar adapted to normally rest on said bracket lip bearing area to resist tension in said anchor rod, a projection formed on said adjusting nut in spaced relation to said collar and normally positioned inwardly of said bracket lip in overlapping relation therewith to lock said adjusting nut against sliding movement, and a groove formed in said bracket lip and adapted to allow movement of said projection therethrough whereby said projection may be brought from the normal position to a position in which the projection rests upon said lip bearing area, said projection having its inner end spaced a predetermined distance from the inner surface of said collar whereby a predetermined amount of slack in said brake rigging is insured.

JOHN J. McBRIDE.
ERNEST R. SCHROEDER.
VICTOR WILLOUGHBY.